(12) United States Patent
Wang et al.

(10) Patent No.: US 12,305,606 B2
(45) Date of Patent: May 20, 2025

(54) WAVE-DRIVEN POWER GENERATION DEVICE OF CONVERTING GRAVITY WORK

(71) Applicant: NATIONAL TAIWAN OCEAN UNIVERSITY, Keelung (TW)

(72) Inventors: Jung-Chang Wang, Keelung (TW); Cheng-Yung Fu, Keelung (TW); Tsan-En Teng, Keelung (TW)

(73) Assignee: NATIONAL TAIWAN OCEAN UNIVERSITY, Keelung (TW)

( * ) Notice: Subject to any disclaimer, the term of this patent is extended or adjusted under 35 U.S.C. 154(b) by 134 days.

(21) Appl. No.: 18/166,592

(22) Filed: Feb. 9, 2023

(65) Prior Publication Data

US 2024/0167448 A1    May 23, 2024

(30) Foreign Application Priority Data

Nov. 21, 2022   (TW) .................................. 111144456

(51) Int. Cl.
    *F03B 13/18*    (2006.01)
(52) U.S. Cl.
    CPC .. *F03B 13/1825* (2013.01); *F05B 2260/4031* (2013.01)
(58) Field of Classification Search
    CPC ..................... F03B 13/1825; F05B 2260/4031
    See application file for complete search history.

(56) References Cited

U.S. PATENT DOCUMENTS

| | | | | |
|---|---|---|---|---|
| 3,666,063 A * | 5/1972 | Schoeman | ............ | F16H 31/001 192/21 |
| 3,832,914 A * | 9/1974 | Pinfield | .................... | F16H 3/003 192/48.92 |
| 4,266,143 A * | 5/1981 | Ng | .......................... | F03B 13/20 60/505 |
| 5,333,517 A * | 8/1994 | Bryson | .................... | F16H 3/003 74/810.1 |
| 7,989,975 B2 * | 8/2011 | Clement | ................. | F03B 13/20 290/53 |
| 8,701,403 B2 * | 4/2014 | Beane | ..................... | F03B 13/20 60/498 |
| 8,915,078 B2 * | 12/2014 | Beane | ..................... | F03B 13/20 60/505 |

(Continued)

*Primary Examiner* — Tulsidas C Patel
*Assistant Examiner* — Thomas K Quigley
(74) *Attorney, Agent, or Firm* — MUNCY, GEISSLER, OLDS & LOWE, P.C.

(57) ABSTRACT

A wave-driven power generation device of converting gravity work is illustrated, which has two power generation modules, a pulley module and two transmission mechanism structures. The pulley module has a rail and a counterweight part, wherein the counterweight part moves back and forth along the rail in a first direction or a second direction due to wave fluctuation, and the first direction and the second direction are two opposite directions. The transmission mechanism structure has a driving part and a gear module rotating with the driving part, wherein the driving part moves along the first direction or the second direction accompanying with movement of the counterweight part, the gear module rotates with the shaft of the rotator set, and the shaft of the rotator set is kept to rotate in respect to a rotating direction to continue to generate the electrical energy due to transmission of the gear module.

10 Claims, 14 Drawing Sheets

(56) References Cited

U.S. PATENT DOCUMENTS

| | | | | |
|---|---|---|---|---|
| 10,006,434 | B1* | 6/2018 | Peed | F03B 13/184 |
| 2008/0295626 | A1* | 12/2008 | Jayasuriya | F16H 3/003 |
| | | | | 74/117 |
| 2009/0160191 | A1* | 6/2009 | Beane | F03B 13/20 |
| | | | | 290/53 |
| 2015/0337795 | A1* | 11/2015 | Skaf | F03B 13/185 |
| | | | | 290/53 |
| 2016/0215751 | A1* | 7/2016 | Sung | F03B 13/1885 |
| 2022/0161621 | A1* | 5/2022 | Verdyan | H02K 21/10 |
| 2023/0167797 | A1* | 6/2023 | Vamvas | B63B 35/44 |
| | | | | 290/53 |
| 2023/0228318 | A1* | 7/2023 | Coplen | F16H 3/10 |
| | | | | 74/368 |
| 2023/0250792 | A1* | 8/2023 | Martinez Revaliente | |
| | | | | F03B 13/18 |
| | | | | 60/505 |
| 2023/0279831 | A1* | 9/2023 | Iyer | F03B 13/188 |
| | | | | 290/53 |

* cited by examiner

WAVE-DRIVEN POWER GENERATION DEVICE OF CONVERTING GRAVITY WORK

TECHNICAL FIELD

The present disclosure relates to a technical field of a wave-driven power generation device, and particularly to, a wave-driven power generation device of converting gravity work, which pulley is driven to move to produce electrical energy due to wave fluctuation.

RELATED ART

With the development of science and technology, the use of energy is increasing day by day. However, only a certain amount of energy can be reserved, and the other energy may be consumed. Further, harmful byproducts generated after energy conversion is also a major problem. Therefore, the use of renewable energy today is more and more important, the renewable energy source can be solar energy, wind power, hydraulic power, tides and so on, which is configured to generate electrical energy through energy conversion. In addition to being reusable without depletion, the power generated by renewable energy itself will not generate waste. However, the use of renewable energy is the goal that everyone is striving for at present, although there are some environmental restrictions on its use and it cannot be used in large quantities.

Nowadays, among renewable energy sources, waves can generate swings, and power generation is designed through tidal currents. Because the generation of sea waves is continuous and uninterrupted, the design for power generation is an ideal source of renewable energy. The current marketed wave-driven power generation device mainly adopts buoys and closed-tube air column for power generation. The buoyancy of the buoys is used to do work through waves, and electrical energy is generated through the height difference generated by buoyancy. However, the problem is that when the buoyancy does work, the buoyancy must bear the weight of the buoy itself and the coil resistance of the power generator shaft. When the piston or buoy rises, ideally, regardless of mechanical friction loss, the work will be converted into the gravitational potential energy of the buoy and the electrical energy of the power generator. When the buoy descends, the gravitational potential energy does work, and when doing work, part of the kinetic energy is converted into electrical energy. But at present, the mainstream buoys all use the rising buoyancy to do work, and if the upward buoyancy displacement is too short, no matter how big the buoyancy is, the work done is limited.

Further, a bigger problem is the corrosion of components. Generally, the active component is made of metal, which requires extremely high toughness and strength, but the disadvantage is that it is easy to corrode and damage, and so it needs to be maintained and replaced frequently. Furthermore, there must be a lubricant to reduce friction between mechanisms, so the contact parts must be covered with lubricating oil. However, every time it moves, the lubricating oil will eventually peel off a part and flow into the ocean, causing ocean pollution. The above disadvantages are the two major problems of the wave-driven power generation device. Of course, in order to protect the internal parts, there are also watertight oil seals, but they will still pollute the ocean.

SUMMARY

An objective of the present disclosure is to provide a wave-driven power generation device of converting gravity work, which is disposed in a completely closed floating body. Due to wave fluctuation, the wave-driven power generation device swings and generates electrical energy, and thus, it avoids damage or failure caused by moisture in various structures and components. The counterweight part of the wave-driven power generation device can slide back and forth due to the wave fluctuation, and thus it continuously drives the power generation module to generate the electrical energy.

In an embodiment of the present disclosure, the provided wave-driven power generation device of converting gravity work comprises at least one power generation module, a pulley module and at least one transmission mechanism structure. The power generation module comprises a stator set and a rotator set, wherein the stator set and the rotator set produce an electromagnetic interaction to generate electrical energy, and the rotator set has shaft. The pulley module comprises a rail and a counterweight part, wherein the counterweight part is disposed on the rail, and moves back and forth along the rail in a first direction and a second direction due to wave fluctuation, wherein the first direction and the second direction are two opposite directions. The transmission mechanism structure comprises a driving part and a gear module rotating with the driving part, wherein the driving part is connected to the counterweight part, and moves along the first direction or the second direction accompanying with movement of the counterweight part, the gear module rotates with the shaft of the rotator set, and the shaft of the rotator set is kept to rotate in respect to a rotating direction to continue to generate the electrical energy due to transmission of the gear module.

In an embodiment of the present disclosure, the gear module comprises a first gear set, a second gear set and a third gear set, the first gear set rotates with the shaft of the rotator set, the third gear set is engaged to the driving part, the second gear set is engaged to the first gear set and the third gear set. When the driving part moves along the first direction, the third gear set directly drives the first gear set to rotate in respect to the rotating direction, when the driving part moves along the second direction, the third gear set drives the first gear set to rotate in respect to the rotating direction via the second gear set.

In an embodiment of the present disclosure, the first gear set comprises a first gear shaft, a first gear, a second gear, a first unidirectional bearing and a second unidirectional bearing, the first gear is connected to the first gear shaft via the first unidirectional bearing and is able to unilaterally rotate, the second gear is connected to the first gear shaft via the second unidirectional bearing and is able to unilaterally rotate, the first gear is engaged to the third gear set, the second gear is engaged to the second gear set, and the first gear shaft rotates with the shaft of the rotator set.

In an embodiment of the present disclosure, the second gear set comprises a second gear shaft, a third gear and a fourth gear, the third gear, the fourth gear and the second gear shaft rotate synchronously, the third gear is engaged to the second gear, and the fourth gear is engaged to the third gear set.

In an embodiment of the present disclosure, the third gear set comprises a third gear shaft, a fifth gear, a sixth gear and a main driving wheel, the fifth gear, the sixth gear, the main driving wheel and the third gear shaft rotate synchronously, the fifth gear is engaged to the first gear, the sixth gear is engaged to the fourth gear, and the main driving wheel is connected to the driving part.

In an embodiment of the present disclosure, the driving part is a chain, a rack or a tension belt, and the main driving wheel is a sprocket, a gear or a belt pulley.

In an embodiment of the present disclosure, the counterweight part comprises a movable frame and a counterweight block disposed in the movable frame, the movable frame is connected to the sliding groove and is able to move, and the driving part is fixed to the movable frame and moves along the sliding groove with the movable frame.

In an embodiment of the present disclosure, the movable frame comprises two long edge walls opposite to each other, two short edge walls opposite to each other, a bottom wall, two plates and multiple wheels, wherein each of the plates is disposed between the corresponding long edge wall and the corresponding plate, the long edge walls and the short edge walls are connected to the bottom wall, one part of the sliding groove is disposed between the corresponding long edge wall and the corresponding plate, and the wheels are scrollably set on the rail.

In an embodiment of the present disclosure, the at least one power generation module comprises two power generation modules, and the at least one transmission mechanism structure comprises two transmission mechanism structures, the two power generation modules are respectively disposed on two opposite sides of the rail, and the two transmission mechanism structures are respectively disposed on the two opposite sides of the rail.

In an embodiment of the present disclosure, the wave-driven power generation device of converting gravity work further comprises an installation base, the installation base comprises a base body and at least one installation part extending from a side of the base body, the sliding groove is disposed on the base body, and the power generation module and the transmission mechanism structure are disposed on the installation part In an embodiment of the present disclosure, the installation part comprises a carrier body, and the carrier body supports the power generation module and the transmission mechanism structure, and is movably disposed on the base body.

In an embodiment of the present disclosure, the at least one installation part further comprises at least one fastening via disposed in the supporting body, and the carrier body is movably disposed on the base body by using the fastening via.

In an embodiment of the present disclosure, the installation base further comprises two blocking parts, and the blocking parts are respectively disposed on two ends of the rail, and configured to limit movement of the counterweight part.

In an embodiment of the present disclosure, the installation base further comprises multiple supporting parts disposed on a bottom of the base body, and the supporting parts are configured to support the base body and the installation part.

In an embodiment of the present disclosure, the wave-driven power generation device of converting gravity work further comprises a floating body and at least one deflector, the floating body has a hollow structure and is configured to support the installation base to make the installation base float on water, and the deflector is disposed on a bottom of the floating body and parallel to the first direction and the second direction.

Regarding the wave-driven power generation device of converting gravity work of the present disclosure, the counterweight part of the pulley module is movably disposed on the sliding groove of the pulley module, and the transmission mechanism structure is connected to the power generation module. Therefore, when two sides of the wave-driven power generation device of converting gravity work are due to wave fluctuation are tilted to each other, the counterweight part moves back and forth on the sliding groove due to gravity (that is, the gravity work is converted to kinetic energy), the driving part moves back and forth along two opposite directions with the counterweight part, and at the same time, the kinetic energy produced by the back and forth movement of the driving part is transmitted to the rotator set of the power generation module via the gear module, such that the rotator set continuously rotate in respect to a rotating direction to generate stable electrical energy. Since the power generation module, the pulley module and the transmission mechanism structure are compactly sealed in the floating body, even the floating body floats on water, the power generation module, the pulley module and the transmission mechanism structure will not be damped, and the lubricant of the power generation module, the pulley module and the transmission mechanism structure will not leakage outside to pollute the water.

BRIEF DESCRIPTIONS OF DRAWINGS

DETAILS OF EXEMPLARY EMBODIMENTS

Figure 1:
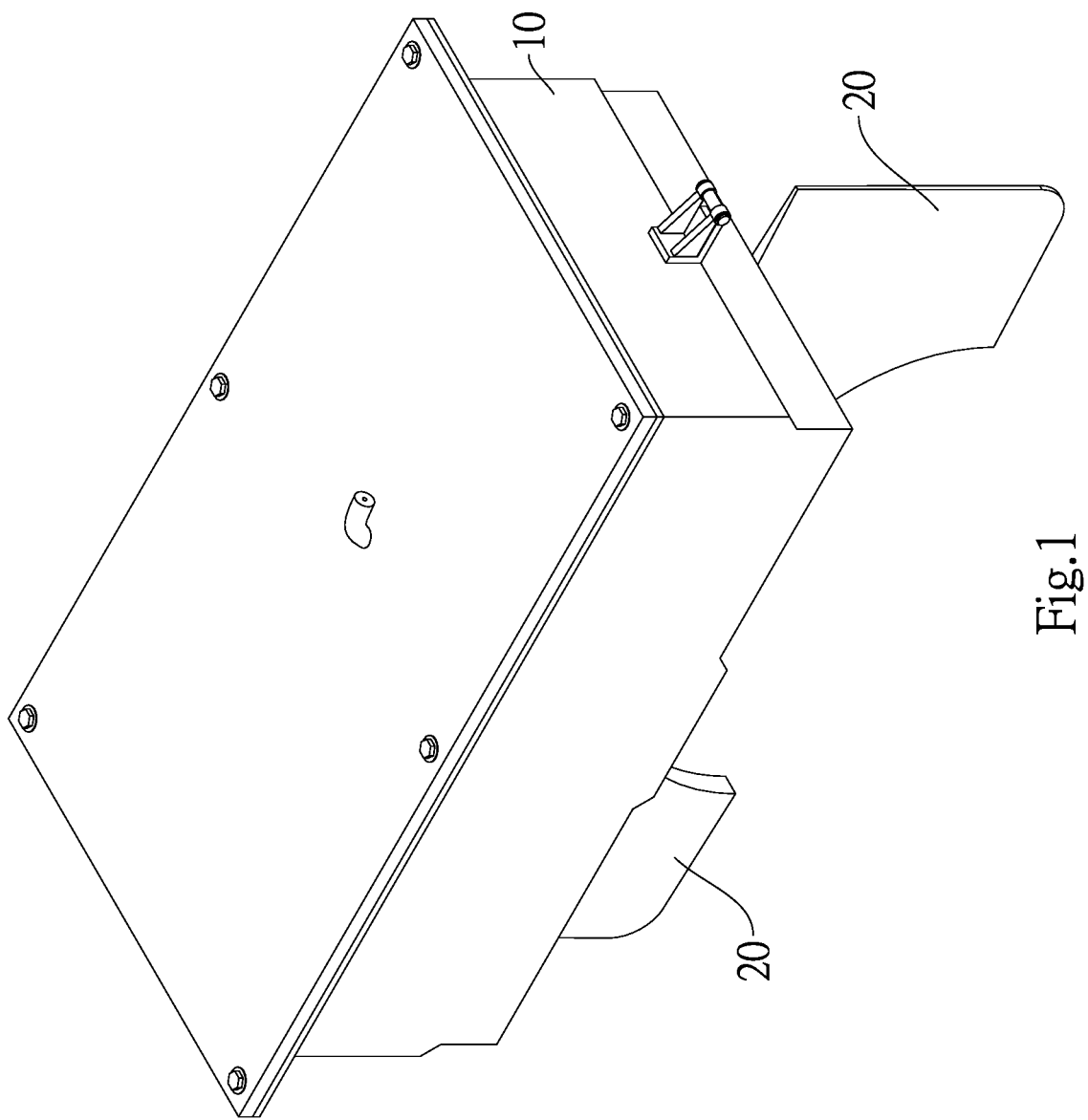
FIG. 1 is a three dimensional view of a wave-driven power generation device of converting gravity work according to an embodiment of the present disclosure.
Figure 2:
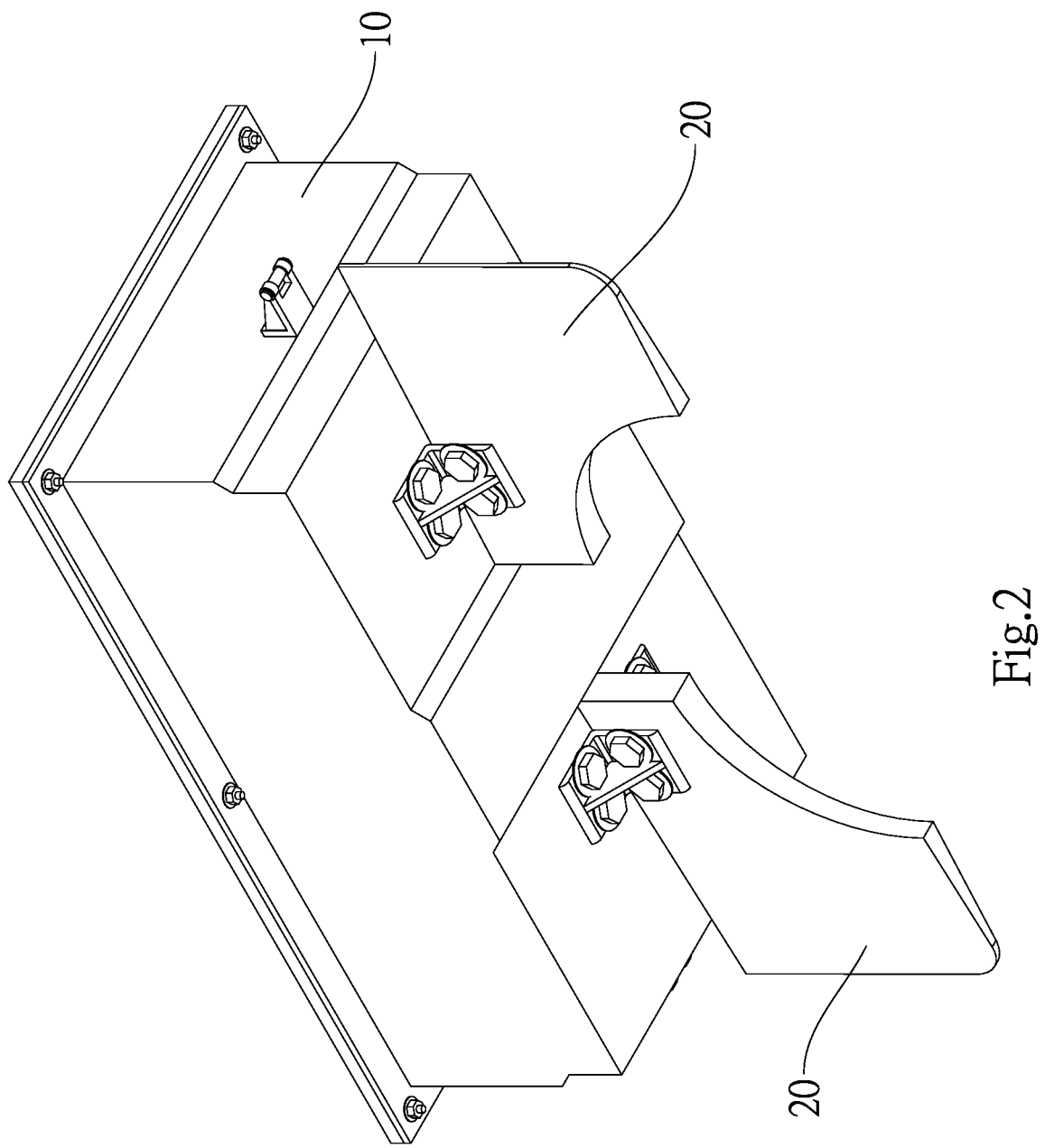
FIG. 2 is another one three dimensional view of the wave-driven power generation device of converting gravity work of FIG. 1.
Figure 3:
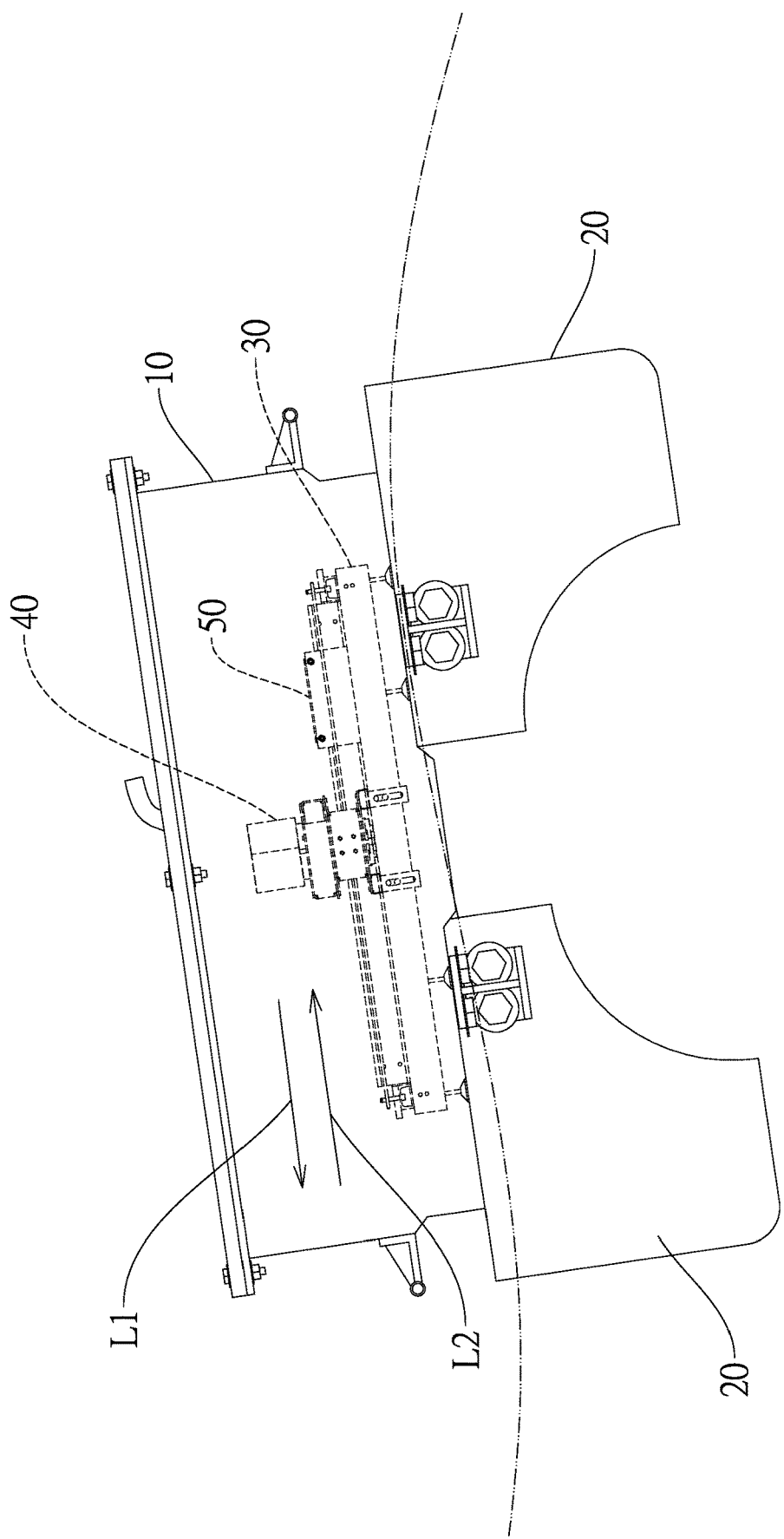
FIG. 3 is a schematic diagram show the wave-driven power generation device of converting gravity work of FIG. 1 swings due to due to wave fluctuation.
Figure 4:
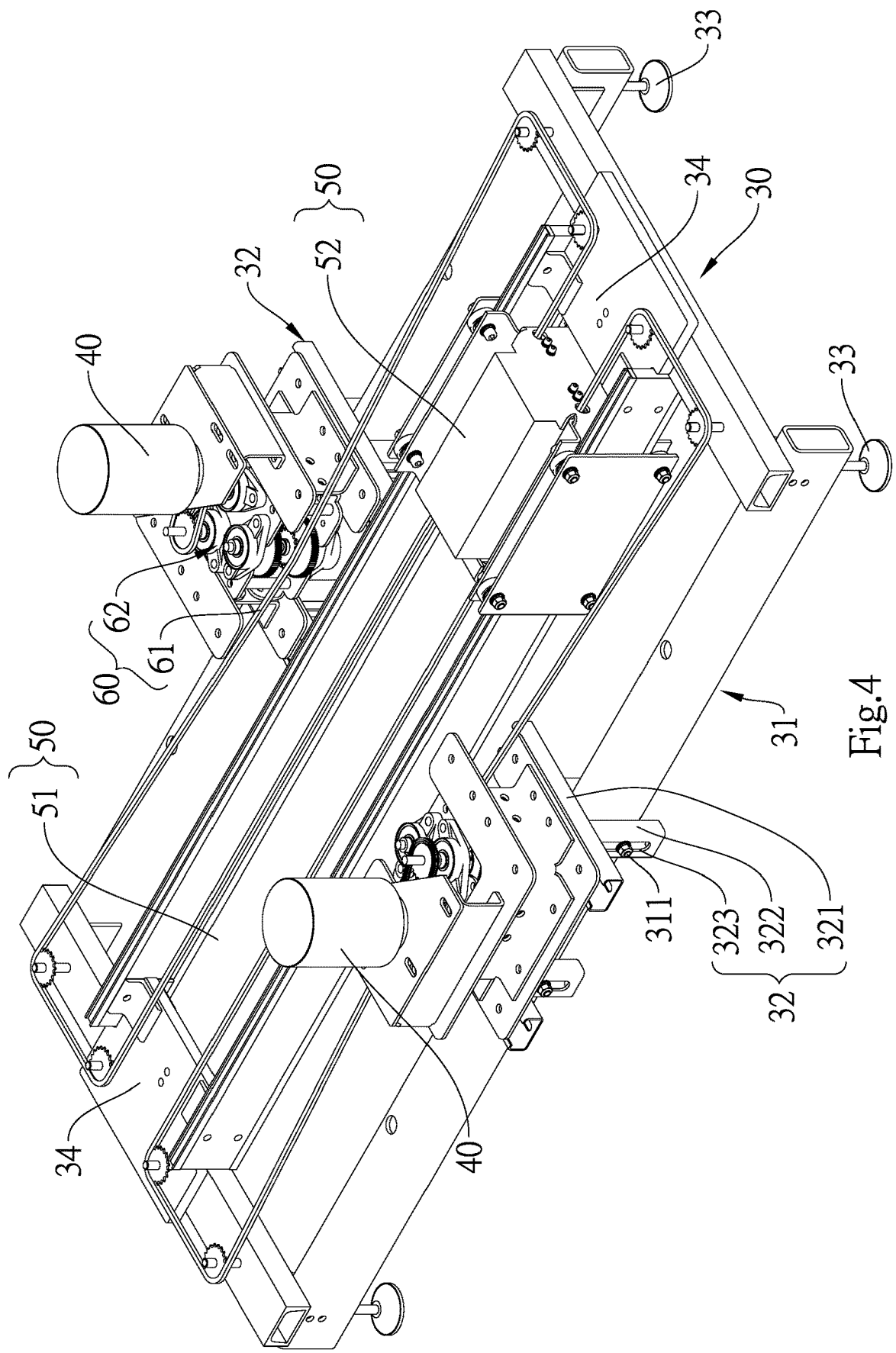
FIG. 4 is a three dimensional view of assembly of two power generation module, a pulley module and two transmission mechanism structures included in the wave-driven power generation device of converting gravity work of FIG. 1.
Figure 5:
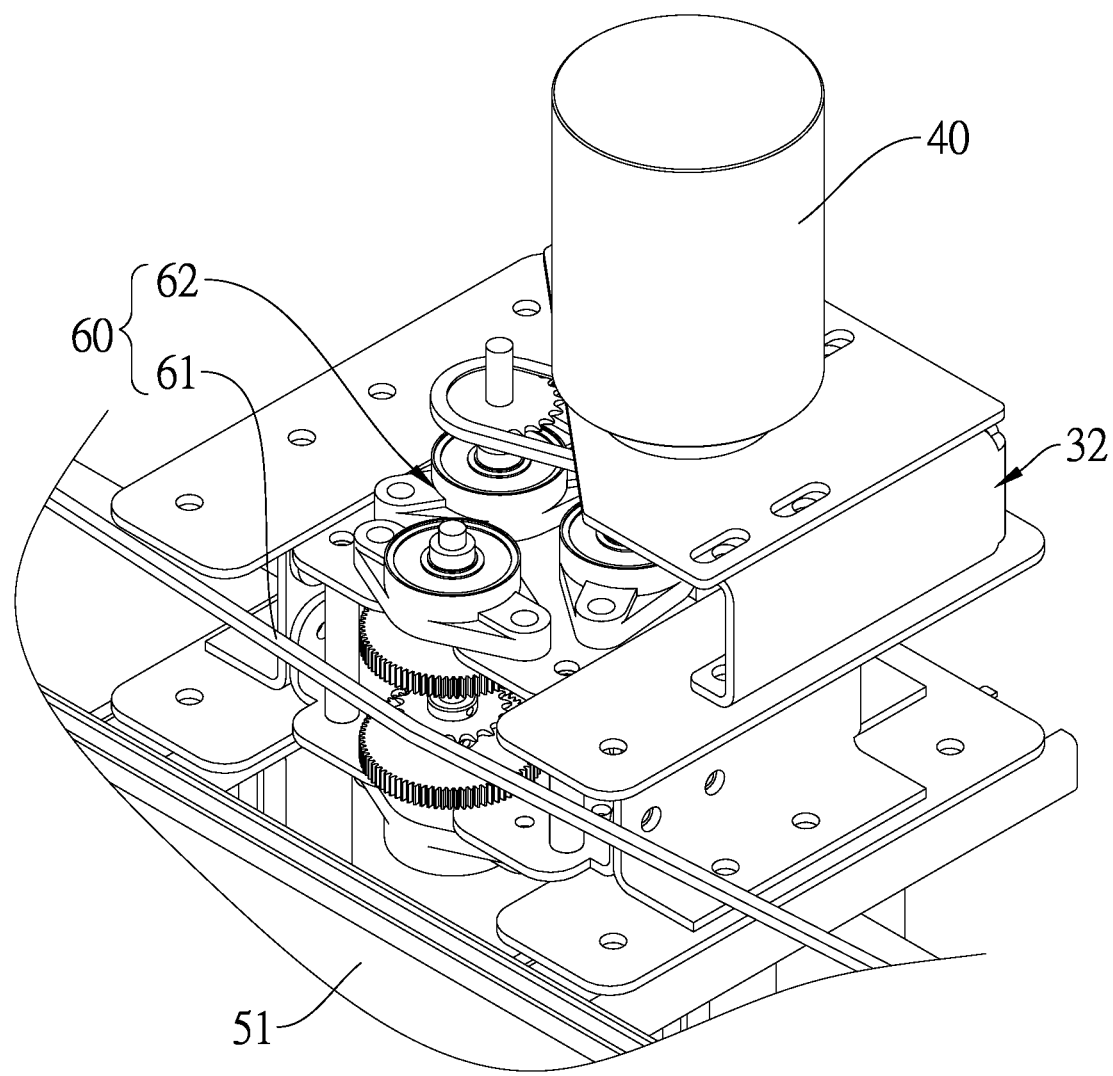
FIG. 5 is an enlarged view of a power generation module and a transmission mechanism structure included in the wave-driven power generation device of converting gravity of FIG. 1.
Figure 6:
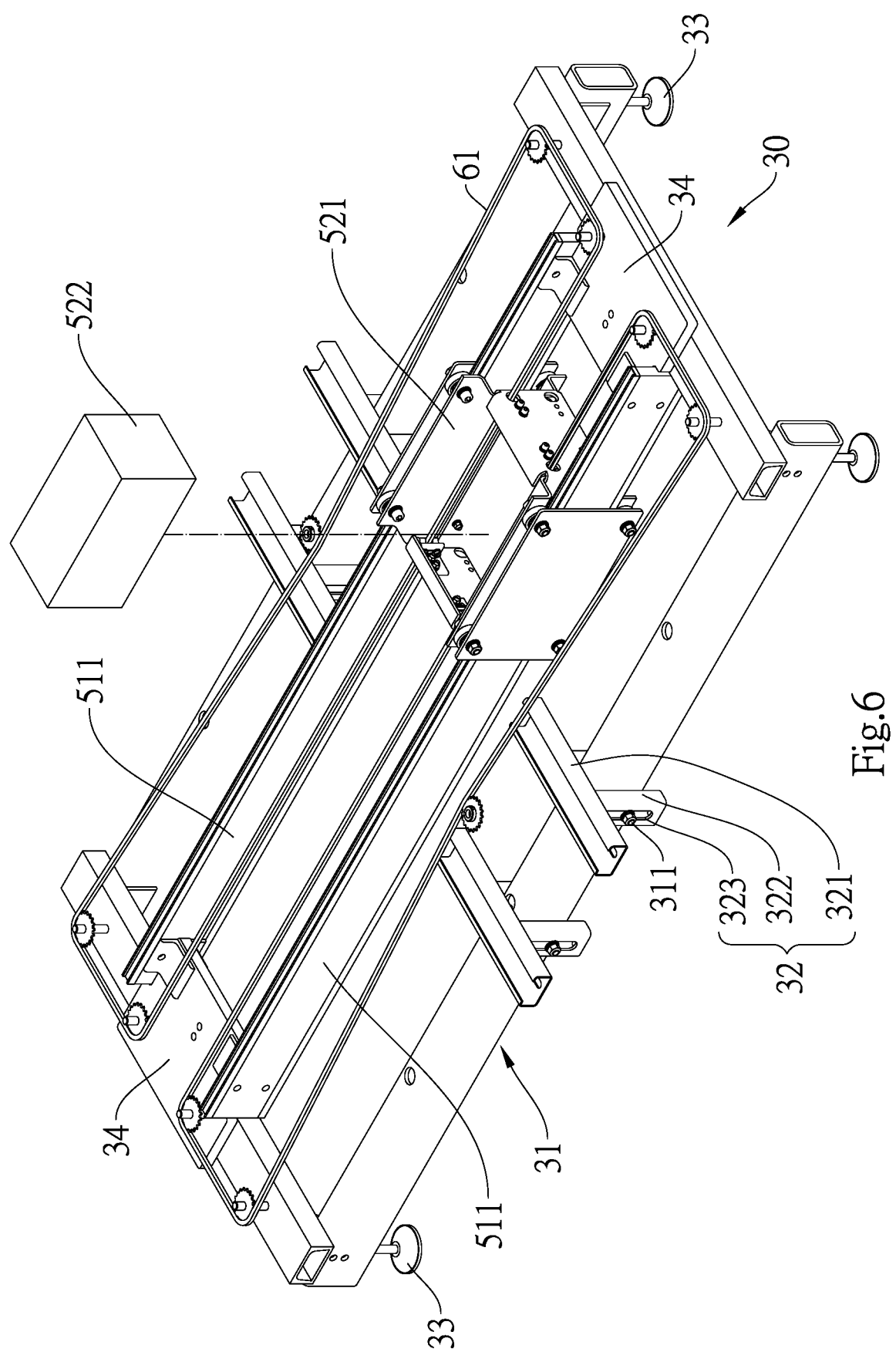
FIG. 6 is an enlarged view of a partial portion of FIG. 4.
Figure 7:
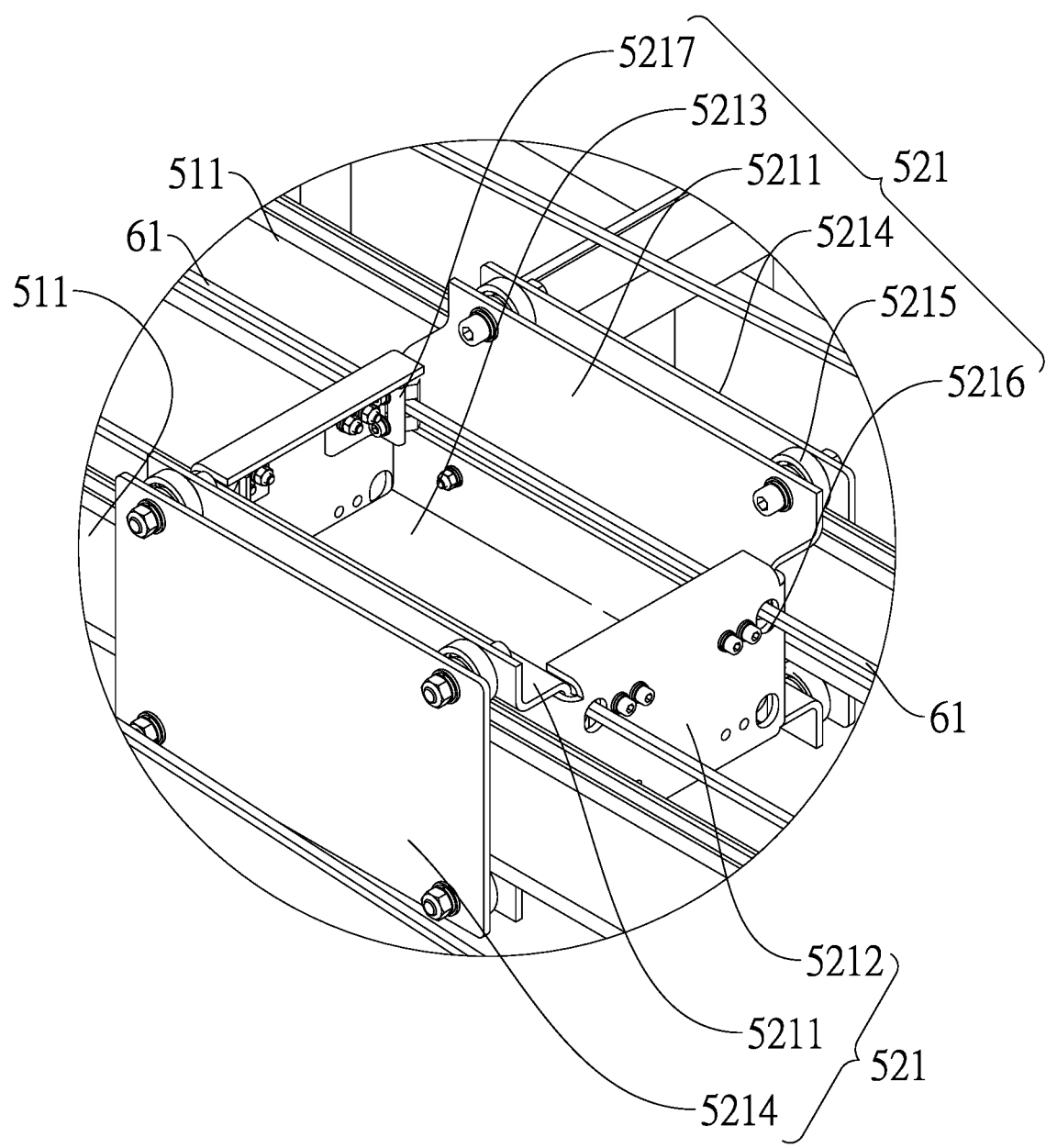
FIG. 7 is a three dimensional view of assembly of a movable frame and a driving part of FIG. 6.

Refer to FIG. 1, FIG. 2 and FIG. 3, FIG. 1 is a three dimensional view of a wave-driven power generation device of converting gravity work according to an embodiment of the present disclosure, FIG. 2 is another one three dimensional view of the wave-driven power generation device of converting gravity work of FIG. 1, and FIG. 3 is a schematic diagram show the wave-driven power generation device of converting gravity work of FIG. 1 swings due to due to wave fluctuation. The wave-driven power generation device of converting gravity work in the embodiment comprises a floating body 10 and at least one deflector 20. The floating body 10 has a hollow structure and forms a watertight structure, such that the floating body 10 can float on water. The floating body 10 has a conductive wire outlet disposed on a top end of the floating body 10, such that the conductive wire of the power generation module 40 can extend from interior to exterior of the floating body 10 to connect to the electrical energy storage device or electric network. The deflector 20 is disposed on a bottom of the floating body 10. When the wave propagates through the wave-driven power generation device of converting gravity work, the deflector 20 is pushed by the water flow to make the floating body 10 move along a direction which is parallel to a wave propagating direction.

Refer to FIG. 4, FIG. 5, FIG. 6 and FIG. 7 at the same time, the wave-driven power generation device of converting gravity work in the embodiment comprises an installation base 30, at least one power generation module 40, a pulley module 50 and at least one transmission mechanism structure 60.

The installation base 30 is disposed in the hollow structure of the floating body 10. The power generation module 40, the pulley module 50 and the transmission mechanism structure 60 are disposed in the installation base 30, such that the power generation module 40, pulley module 50 and the transmission mechanism structure 60 swing with the floating body 10 when the wave passes. The wave-driven power generation device of converting gravity work in the embodiment comprises two power generation modules 40 and two transmission mechanism structures 60. The installation base 30 comprises a base body 31 and two installation parts 32 extending from two sides of the base body 31. The pulley module 50 is disposed on the base body 31. The power generation module 40 and the transmission mechanism structure 60 are disposed on the installation part 32. The two installation parts 32 in the embodiment are respectively disposed on the two opposite side of the base body 31. The installation base 30 can further comprise multiple supporting parts 33. The supporting parts 33 are disposed on a bottom of the base body 31. As shown in FIG. 3, the supporting parts 33 are configured to support the base body 31 to be disposed on the bottom of the floating body 10. The installation part 32 comprises a carrier body 321, a supporting body 322 and a fastening via 323, wherein the fastening via 323 is formed by opening a long rectangular hole on a lower angle steel. The two power generation modules 40 and the two transmission mechanism structures 60 are supported by the carrier body 321. The carrier body 321 is supported by the supporting body 322 to be disposed on the base body 31. The fastening via 323 is formed in the supporting body 322. By using the fastening via 323, the positing bolt 311 can move up or down, such that parts of the installation base 30 can have the same heights in respect to the bottom surface of the floating body 10, and the installation heights of the two power generation modules 40, and the riving part 61 and the gear module 62 of transmission mechanism structures 60 are the same one. Accordingly, it makes the counterweight part 52 slide smoothly and prevents the driving part 61 from falling off.

The power generation module 40 comprise a stator set and a rotator set, wherein the stator set and the rotator set produce an electromagnetic interaction to generate electrical energy, and the rotator set has shaft 41. The stator set is composed of permanent magnets, the rotator set is a coil, and the rotator set rotates in the magnetic field generated by the stator set to generate current and provide electrical energy.

The pulley module 50 comprises a sliding groove 51 and a counterweight part 52. The counterweight part 52 is disposed on the sliding groove 51 and can move back and forth along the sliding groove 51 in a first direction L1 and a second direction L2, wherein the first direction L1 and the second direction L2 are two opposite directions. The sliding groove 51 is disposed on the installation base 30 of the base body 31, and the two installation parts 32 are respectively disposed on two opposite sides of the sliding groove 51. The sliding groove 51 is formed by making two rail walls 511 opposite to each other form on a base body 31 having a plate shape. The installation base 30 further comprises two blocking parts 34, and the blocking parts 34 are respectively disposed on two terminal ends of the sliding groove 51, and configured to limit movement of the counterweight part 52. The blocking parts 34 in the embodiment are embedded between the two rail walls 511 and higher than the base body 31 between the two rail walls 511 to form a ladder-like structure, thereby stopping the counterweight part 52 sliding between the two rail walls 511.

The counterweight part 52 comprises a movable frame 521 and a counterweight block 522 disposed in the movable frame 521. In the embodiment, the movable frame 521 comprises two long edge walls 5211 opposite to each other, two short edge walls 5212 opposite to each other, a bottom wall 5213, two plates 5214 and multiple wheels 5215. The long edge walls 5211 and the short edge walls 5212 are connected to the bottom wall 5213. The long edge walls 5211, the short edge walls 5212 and the bottom wall 5213 can be formed by bending plate objects. The long edge wall 5211 is fixed to one of the plates 5214, and each rail wall 511 is located between the corresponding long edge wall 5211 and the corresponding plate 5214. The wheels 5215 are disposed between the long edge wall 5211 and the plate 5214, and the wheels 5215 contacts the upper and lower edges of the rail wall 511, such that the movable frame 521 is stably positioned on the rail wall 511. By using the wheel 5215, the friction of movement on the rail wall 511 is reduced, such that it achieves smooth movement. Each short edge wall 5212 has two vias 5216 and two locking parts 5217, the driving part 61 can penetrate through the via 5216, and the locking part 5217 makes the driving part 61 be fixed to the short edge wall 5212, such that the driving part 61 and the movable frame 521 can move synchronously. The counterweight block 522 is a cuboid heavy block, which can be placed in the accommodation space of the movable frame 521, and moves together with the movable frame 521 on the sliding groove 51 by gravity.

The transmission mechanism structure 60 comprises a driving part 61 and a gear module 62 rotating with the transmission mechanism structure 60. The driving part 61 is connected to the movable frame 521 of the counterweight part 52, and moves along the first direction L1 or second direction L2 with the movement of the counterweight part 52. The gear module 62 rotates with shaft 41 of the rotator set, and the shaft 41 of the rotator set is kept rotating in the same rotation direction by the transmission of the gear module 62, so as to generate electrical energy continuously.

Figure 8:
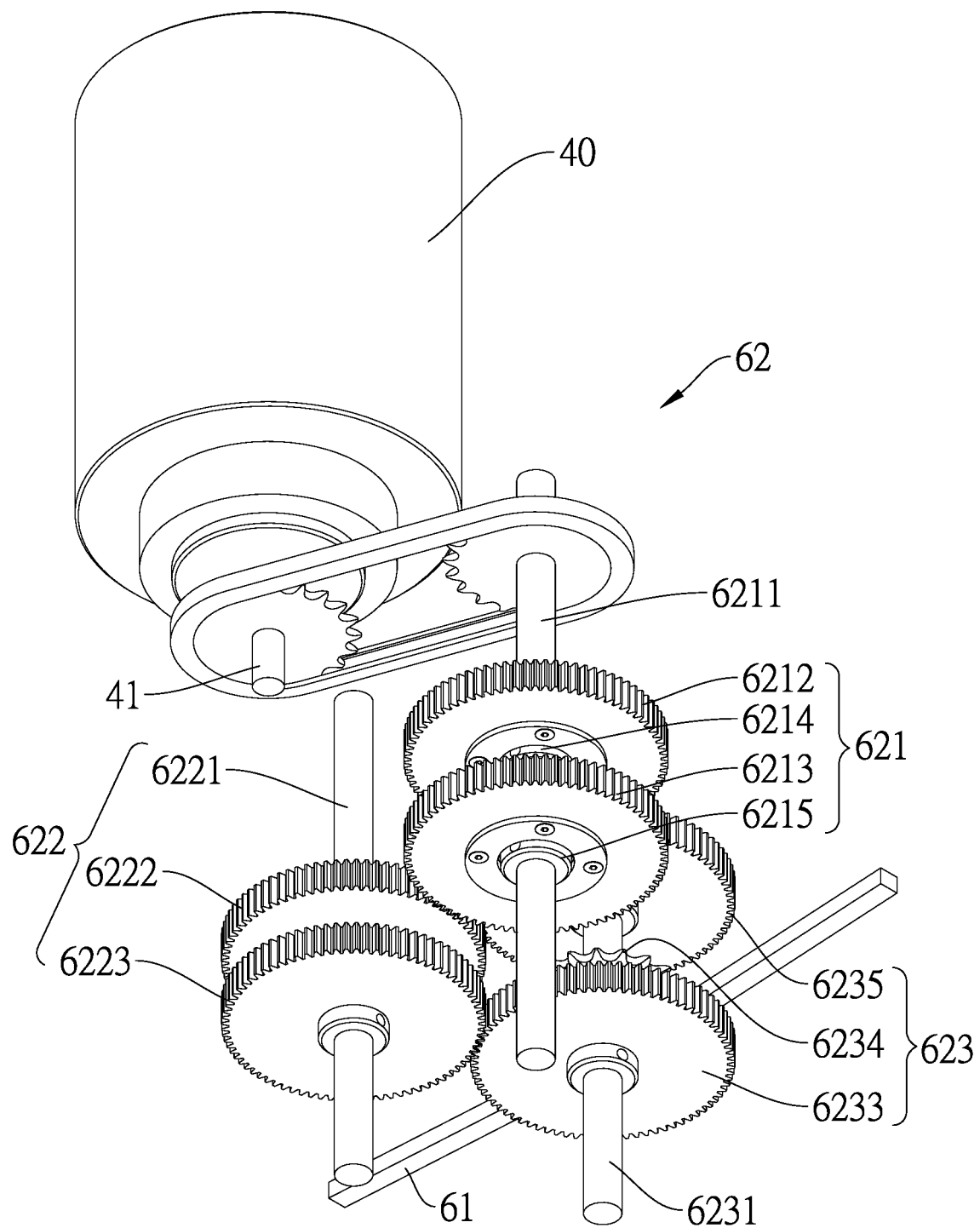
FIG. 8 is an enlarged view of the power generation module and the of gear module of the transmission mechanism structure.
Figure 9:
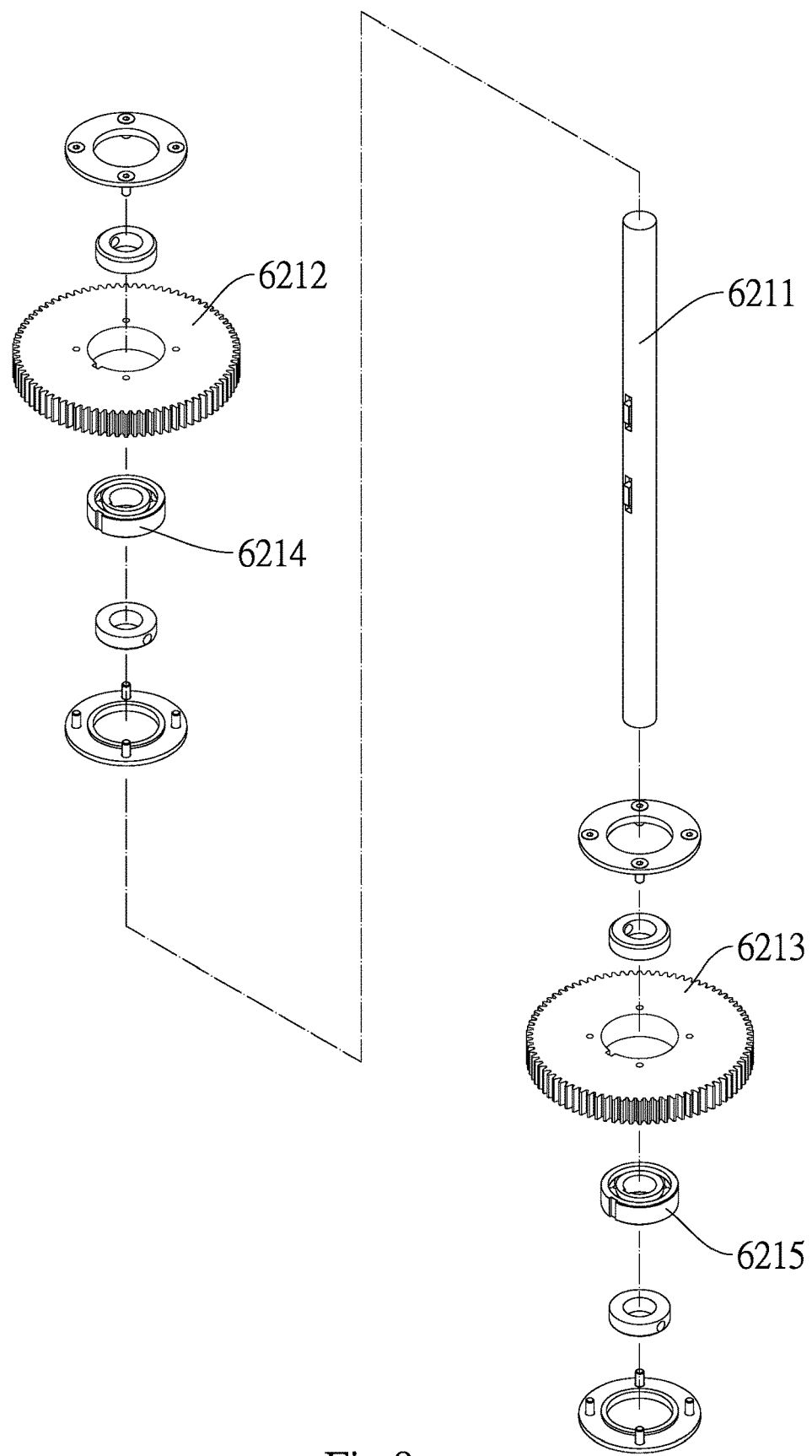
FIG. 9 is a three dimensional explosive diagram of the first gear set of the gear module.
Figure 10:
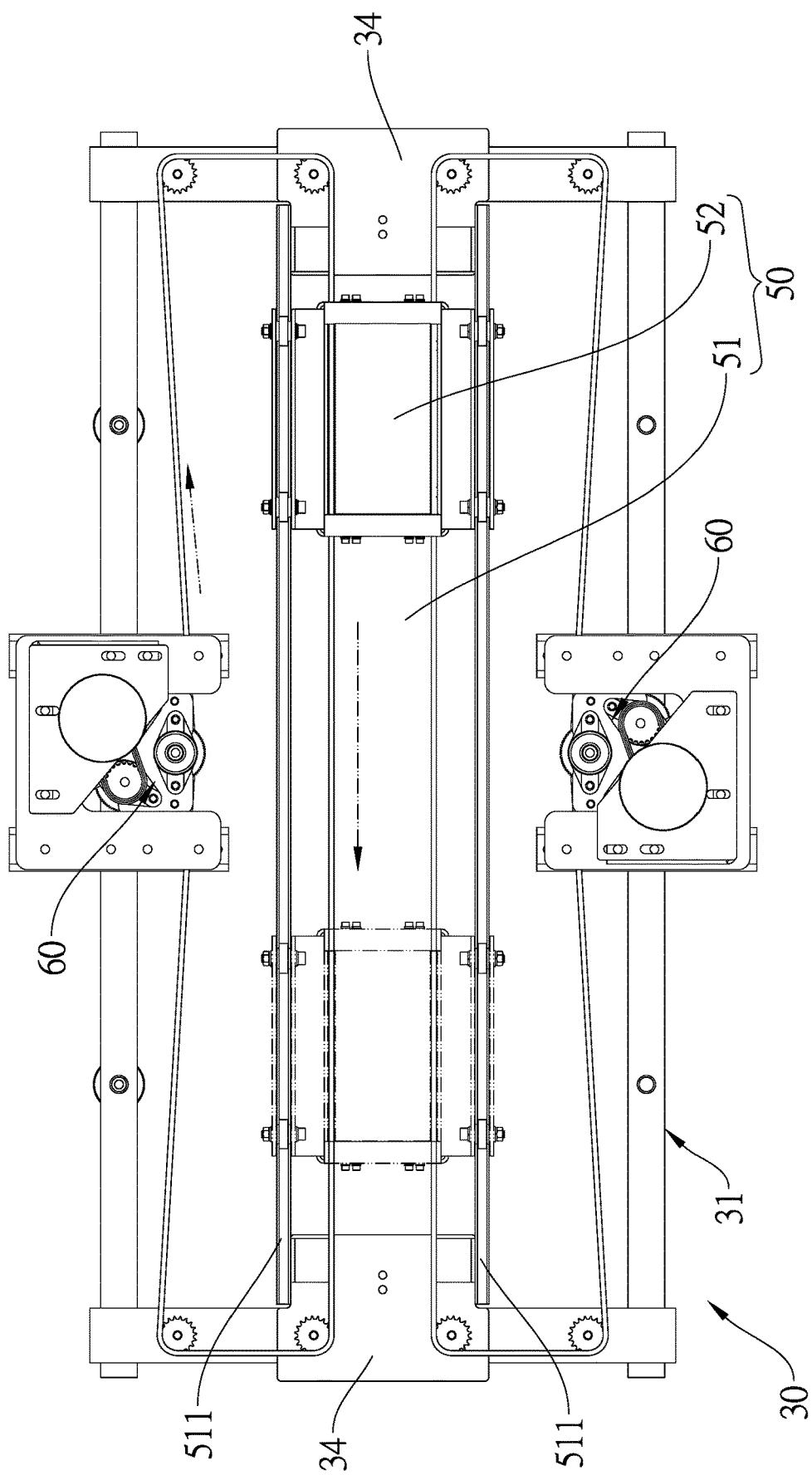
FIG. 10 is a top view showing the movements of the pulley module.

Refer to FIG. 8 and FIG. 9 at the same time, the gear module 62 comprises a first gear set 621, a second gear set 622 and a third gear set 623. The first gear set 621 rotates with the shaft 41 of the rotator set. The third gear set 623 is engaged to the driving part 61, the second gear set 622 is engaged to the first gear set 621 and the third gear set 623. When the driving part 61 moves along the first direction L1, the third gear set 623 directly drives the first gear set 621 to rotate in respect to the rotating direction; and when the driving part 61 moves along the second direction L2, the third gear set 623 drives the first gear set 621 to rotate in respect to the rotating direction via the second gear set 622.

As shown in FIG. 9, the first gear set 621 comprises a first gear shaft 6211, a first gear 6212, a second gear 6213, a first unidirectional bearing 6214 and a second unidirectional bearing 6215, the first gear 6212 is connected to the first gear shaft 6211 via the first unidirectional bearing 6214 and is able to unilaterally rotate, such that when the first gear 6212 rotates clockwise, the first gear shaft 6211 also rotates clockwise synchronously, and when the first gear 6212 rotates counterclockwise, the first gear shaft 6211 rotates opposite to the rotation of the first gear 6212. The second gear 6213 is connected to the first gear shaft 6211 via the second unidirectional bearing 6215 and is able to unilaterally rotate, such that when the second gear 6213 rotates counterclockwise, the first gear shaft 6211 also rotates counterclockwise synchronously, and when second gear 6213 rotates clockwise, the first gear shaft 6211 rotates opposite to the rotation of the second gear 6213. The first gear 6212 is engaged to the third gear set 623, the second gear 6213 is engaged to the second gear set 622, and the first gear shaft 6211 rotates with the shaft 41 of the rotator set via the structures of sprocket and chain.

The second gear set 622 comprises a second gear shaft 6221, a third gear 6222 and a fourth gear 6223, the third gear 6222, the fourth gear 6223 and the second gear shaft 6221 rotate synchronously, the third gear 6222 is engaged to the second gear 6221, and the fourth gear 6223 is engaged to the third gear set 623.

The third gear set 623 comprises a third gear shaft 6231, a fifth gear 6232, a sixth gear 6233 and a main driving wheel 6234, the fifth gear 6232, the sixth gear 6233, the main driving wheel 6234 and the third gear shaft 6231 rotate synchronously, the fifth gear 6232 is engaged to the first gear 6212, the sixth gear 6233 is engaged to the fourth gear 6223, and the main driving wheel 6234 is connected to the driving part 61.

In the embodiment, the driving part 61 is a chain, and the main driving wheel 6234 is a sprocket. However, in other one embodiment, the driving part 61 is a rack, and the main driving wheel 6234 is a gear; or alternatively, the driving part 61 is a tension belt, and the main driving wheel 6234 is a belt pulley.

Figure 11:
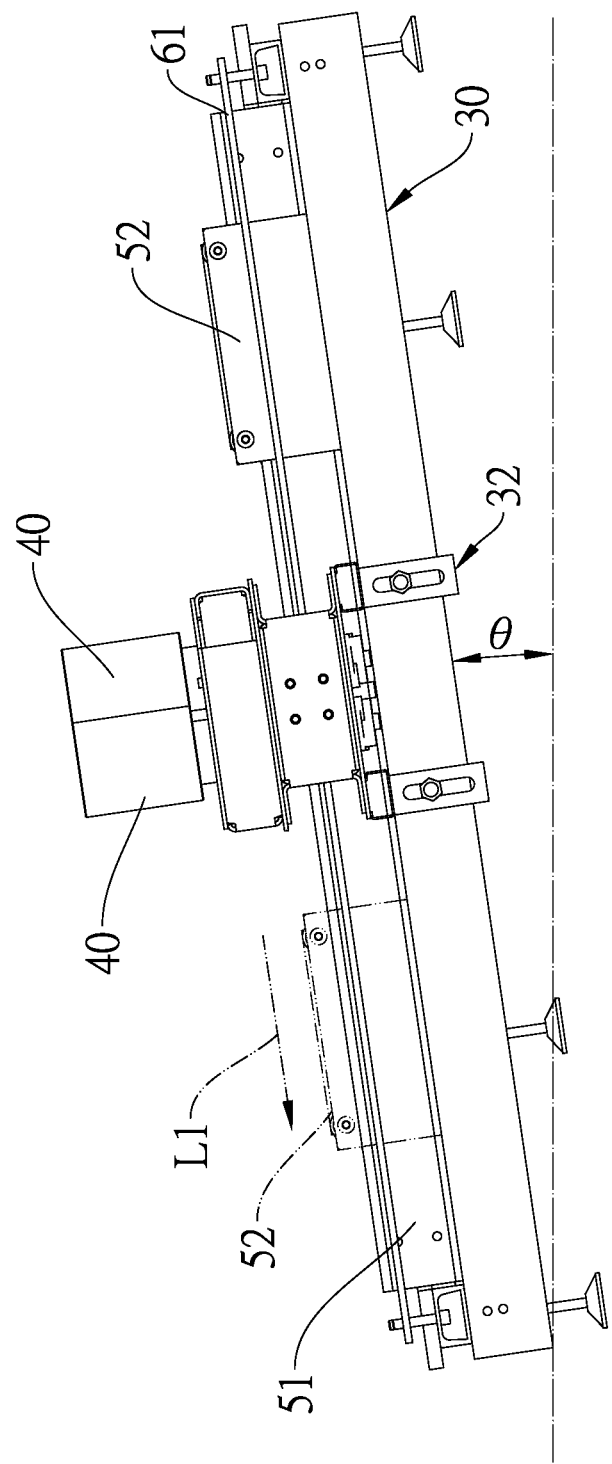
FIG. 11 is a schematic diagram showing the two sides of wave-driven power generation device of converting gravity work are tilted to each other (p.s. the right side is higher than the left side) due to wave fluctuation.
Figure 12:
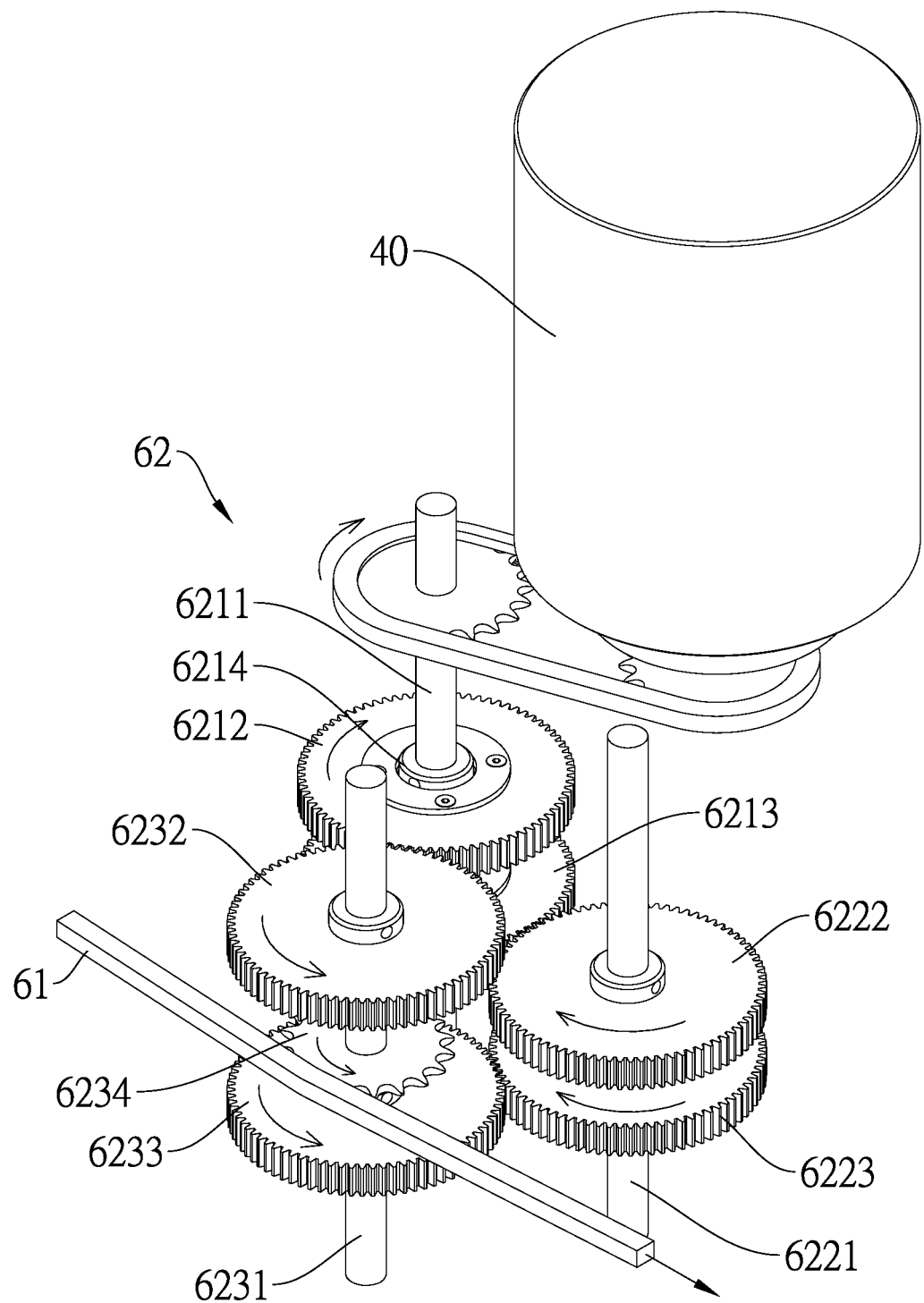
FIG. 12 is a three dimensional diagram of the gear module of the transmission mechanism structure and the power generation module of FIG. 11.

Refer to FIG. 10, FIG. 11, FIG. 12, FIG. 13 and FIG. 14, when energy of the wave of the water area is transmitted to the wave-driven power generation device of converting gravity work, as shown in FIG. 11, the energy of the wave makes the water surface form a crest and a trough. At the same time, the buoyancy works on the wave-driven power generation device of converting gravity work, so that the crest lifts the right end of the wave-driven power generation device of converting gravity work, and the trough lowers the left end of the wave-driven power generation device of converting gravity work. The wave lifts the counterweight part 52 to convert part of the wave energy into the gravitational potential energy of the counterweight part 52, and then the counterweight part 52 slides down from the right to the left of the sliding groove 51 inclined at an angle of θ due to gravity, and at the same time drives the driving part 61 to move. As shown in FIG. 12, the driving part 61 moves and drives the main driving wheel 6234 of the third gear set 623 to rotate counterclockwise, so that the third gear shaft 6231, fifth gear 6232 and sixth gear 6233 rotate counterclockwise synchronously, and the first gear 6212 engaged to the fifth gear 6232 rotates clockwise. As mentioned above, the first gear 6212 can rotate clockwise synchronously with the first gear shaft 6211 through the first unidirectional bearing 6214, so the first gear shaft 6211 rotates clockwise and then drives the shaft 41 of the rotator set of the power generation module 40 to rotate clockwise. Meanwhile, the second gear set 622 rotates clockwise by engaging the sixth gear 6233 with the fourth gear 6223. The third gear 6222 of the second gear set 622 rotates clockwise so that the second gear 6213 engaged to the first gear set 621 rotates counterclockwise. As mentioned above, the second gear 6213 can generate relative rotation with the first gear shaft 6211 in the clockwise direction through the second unidirectional bearing 6215, so the rotation of the second gear set 622 does not affect the rotation of the first gear shaft 6211 of the first gear set 621 at this moment, and the third gear set 623 directly drives the first gear shaft 6211 to rotate clockwise, and then the shaft 41 of the rotator set of the power generation module 40 rotates clockwise.

Figure 13:
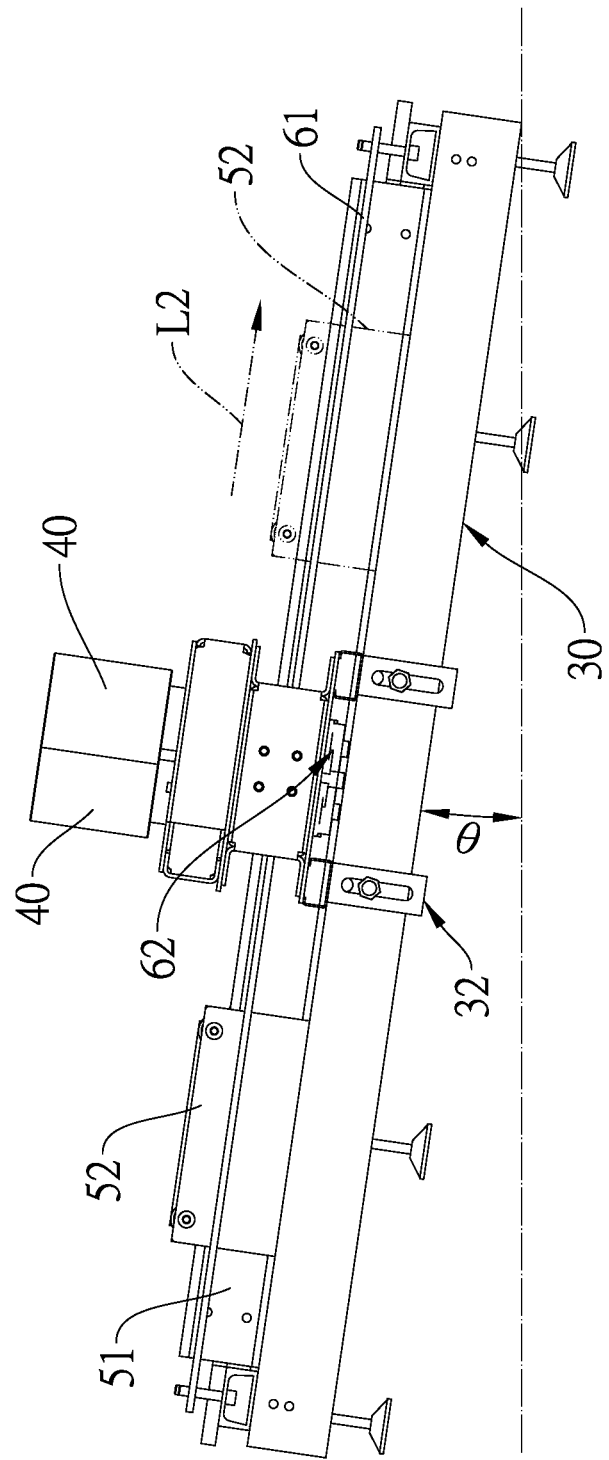
FIG. 13 is another one schematic diagram showing the two sides of wave-driven power generation device of converting gravity work are tilted to each other (p.s. the left side is higher than the right side) due to wave fluctuation.
Figure 14:
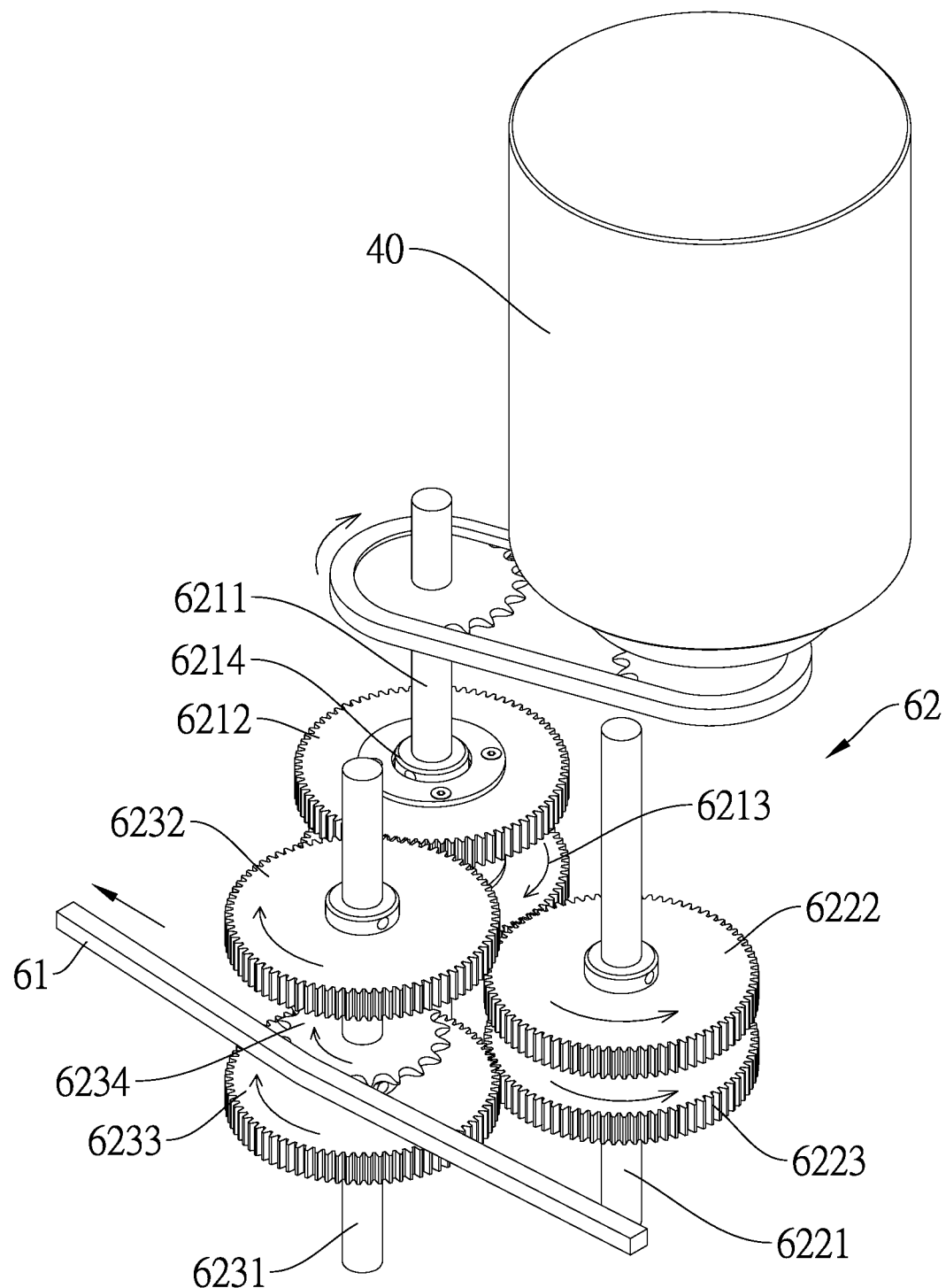
FIG. 14 is a three dimensional diagram of the gear module of the transmission mechanism structure and the power generation module of FIG. 14.

As shown in FIG. 13, when the wave continues to move forward, the crest moves to the left end of the wave-driven power generation device of converting gravity work, and the trough of the adjacent wave moves to the right end of the wave-driven power generation device of converting gravity work, the counterweight part 52 moving to the left end is lifted by the waves, and then slides down from the left end to the right end under the action of gravity, and at the same time drives the driving part 61 to move in the opposite direction. As shown in FIG. 14, the driving part 61 drives the main driving wheel 6234 of the third gear set 623 to rotate clockwise, so that the third gear shaft 6231, fifth gear 6232 and sixth gear 6233 rotate clockwise synchronously, and the first gear 6212 engaged to the fifth gear 6232 rotates counterclockwise. As mentioned above, the first gear 6212 can relatively rotate counterclockwise with the first gear shaft 6211 through the first unidirectional bearing 6214, so the third gear set 623 does not directly drive the first gear set 621 to rotate. The second gear set 622 rotates counterclockwise by engaging the sixth gear 6233 with the fourth gear 6223. The third gear 6222 of the second gear set 622 rotates counterclockwise so that the second gear 6213 of the first gear set 621 engaged to the third gear 6222 rotates clockwise. As mentioned above, the second gear 6213 can rotate clockwise synchronously with the first gear shaft 6211 through the second unidirectional bearing 6215, so the third gear set 623 indirectly drives the first gear shaft 6211 to rotate clockwise through the second gear set 622, thereby making the shaft 41 of the rotator set of the power generation module 40 rotates clockwise. In this way, the driving part 61 moves back and forth in two opposite directions, and the shaft 41 of the rotator set of the power generation module 40 continues to rotate clockwise, thereby generating stable electrical energy.

The wave-driven power generation device of converting gravity work of the present disclosure can be applied in various water areas, such as marine aquaculture areas or freshwater aquaculture areas.

Regarding the wave-driven power generation device of converting gravity work of the present disclosure, the counterweight part of the pulley module is movably disposed on the sliding groove of the pulley module, and the transmission mechanism structure is connected to the power generation module. Therefore, when two sides of the wave-driven power generation device of converting gravity work are due to wave fluctuation are tilted to each other, the counterweight part moves back and forth on the sliding groove due to gravity (that is, the gravity work is converted to kinetic energy), the driving part moves back and forth along two opposite directions with the counterweight part, and at the same time, the kinetic energy produced by the back and forth movement of the driving part is transmitted to the rotator set of the power generation module via the gear module, such that the rotator set continuously rotate in respect to a rotating direction to generate stable electrical energy. Since the power generation module, the pulley module and the transmission mechanism structure are compactly sealed in the floating body, even the floating body floats on water, the power generation module, the pulley module and the transmission mechanism structure will not be damped, and the lubricant of the power generation module, the pulley module and the transmission mechanism structure will not leakage outside to pollute the water.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A wave-driven gravity type power generation device comprising:
   two power generation modules, each comprising a stator set and a rotor set, wherein an electromagnetic interaction is produced between the stator set and the rotor set to generate electricity, each rotor set having a respective shaft;
   a pulley module, comprising a sliding groove and a counterweight, wherein
      the counterweight is arranged in the sliding groove and moves back and forth along the sliding groove in a first direction and a second direction by water waves, wherein the first direction and the second direction are opposite to each other;
   two transmission mechanisms, each comprising a drive and a gear module connected to the drive, wherein
      each drive is combined with the counterweight and moves along the first direction and the second direction with movement of the counterweight,
      each gear module is drivingly linked with the respective shaft of the respective rotor set such that the shaft is kept to rotate in one direction for continuously generating the electricity; and
   an installation base comprising a base body and at least two installation parts extending from a side of the base body, the sliding groove being disposed on the base body, wherein each of the at least two installation parts comprises a carrier body and a supporting body, wherein one of the two power generation modules and one of the two transmission mechanisms are disposed on each of the carrier bodies of the at least two installation parts, wherein each of the supporting bodies comprises at least one fastening hole for adjusting a height of the carrier body,
   wherein one of the two power generation modules and one of the two transmission mechanisms are disposed on one side of the sliding groove and another one of the two power generation modules and another one of the two transmission mechanisms are disposed on an opposite side of the sliding groove, the two power generation modules and the drive and the gear module of the two transmission mechanisms are installed at the same horizontal level for the counterweight to slide smoothly and preventing the drive from falling off.

2. The wave-driven power generation device of converting gravity work of claim 1, wherein the gear module of each transmission mechanism comprises a first gear set, a second gear set, and a third gear set,
   wherein the first gear set rotates with the respective shaft of the rotor set, the third gear set is engaged to the drive, the second gear set is engaged to the first gear set and the third gear set, when the drive moves along the first direction, the third gear set directly drives the first gear set to rotate in respect to the rotating direction, when the driving part drive moves along the second direction, the third gear set drives the first gear set to rotate in respect to the rotating direction via the second gear set,
   wherein the first gear set comprises a first gear shaft, a first gear, a second gear, a first unidirectional bearing and a second unidirectional bearing, the first gear is connected to the first gear shaft via the first unidirectional bearing and unidirectionally rotates, the second gear is connected to the first gear shaft via the second unidirectional bearing and unidirectionally rotates, the first gear is engaged to the third gear set, the second gear is engaged to the second gear set, and the first gear shaft rotates with the shaft of the rotor set.

3. The wave-driven power generation device of converting gravity work of claim 2, wherein the second gear set comprises a second gear shaft, a third gear and a fourth gear, wherein the third gear, the fourth gear and the second gear shaft rotate synchronously, the third gear is engaged to the second gear, and the fourth gear is engaged to the third gear set.

4. The wave-driven power generation device of converting gravity work of claim 3, wherein the third gear set comprises a third gear shaft, a fifth gear, a sixth gear and a main driving wheel, wherein the fifth gear, the sixth gear, the main driving wheel and the third gear shaft rotate synchronously, the fifth gear is engaged to the first gear, the sixth gear is engaged to the fourth gear, and the main driving wheel is connected to the driving part drive.

5. The wave-driven power generation device of converting gravity work of claim 4, wherein the drive is a chain, a rack or a tension belt, and the main driving wheel is a sprocket, a gear or a belt pulley.

6. The wave-driven power generation device of converting gravity work of claim 1, wherein the counterweight comprises a movable frame and a counterweight block disposed in the movable frame, the movable frame is connected to the sliding groove and is able to move, and the drive is fixed to the movable frame and moves along the sliding groove with the movable frame.

7. The wave-driven power generation device of converting gravity work of claim 6, wherein the movable frame comprises two long edge walls opposite to each other, two short edge walls opposite to each other, a bottom wall, two plates and multiple wheels, wherein the long edge walls and the short edge walls are connected to the bottom wall, one part of the sliding groove is disposed between one of the two long edge walls and one of the two plates, and the wheels are scrollably set on the sliding groove.

8. The wave-driven power generation device of converting gravity work of claim 1, wherein the installation base further comprises two blocking parts, and the blocking parts are respectively disposed on two ends of the sliding groove, and configured to limit movement of the counterweight part.

9. The wave-driven power generation device of converting gravity work of claim 1, wherein the installation base further comprises multiple supporting parts disposed on a bottom of the base body, and the supporting parts are configured to support the base body and the installation part.

10. The wave-driven power generation device of converting gravity work of claim 1, further comprising a floating body and at least one deflector, the floating body has a hollow structure and is configured to support the installation base to make the installation base float on water, and the deflector is disposed on a bottom of the floating body and parallel to the first direction and the second direction.

\* \* \* \* \*